Oct. 12, 1948.  E. E. STOECKLY  2,451,252
FLEXIBLE CONDUIT JOINT
Filed Feb. 1, 1945

Inventor:
Eugene E. Stoeckly,
by Harry E Dunham
His Attorney.

UNITED STATES PATENT OFFICE 2,451,252

FLEXIBLE CONDUIT JOINT

Eugene E. Stoeckly, Marblehead, Mass., assignor to General Electric Company, a corporation of New York Application February 1, 1945, Serial No. 575,621

4 Claims. (Cl. 285—90)

The present invention relates to flexible conduit joints for connecting two conduits or conduit sections subject to relative axial, angular, and rotational displacements. Such conduits are used for example in aircraft for conducting gases from the exhaust ports of a combustion engine to a gas turbine such as that used to drive a supercharger.

The object of my invention is to provide an improved flexible joint of the type aforementioned which is simple in design, cheap to manufacture, and effective in operation. A further object is to provide a flexible joint designed to minimize leakage.

Figure 1:
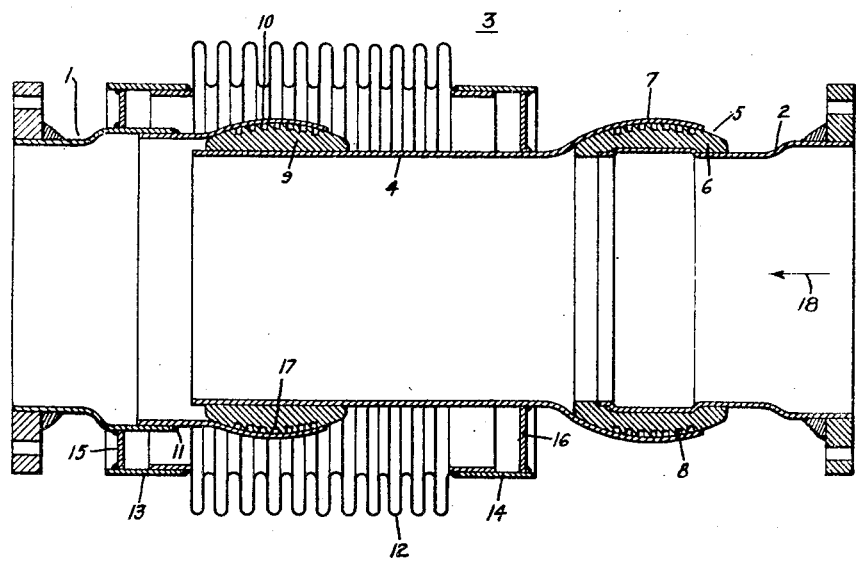
Figure 2:
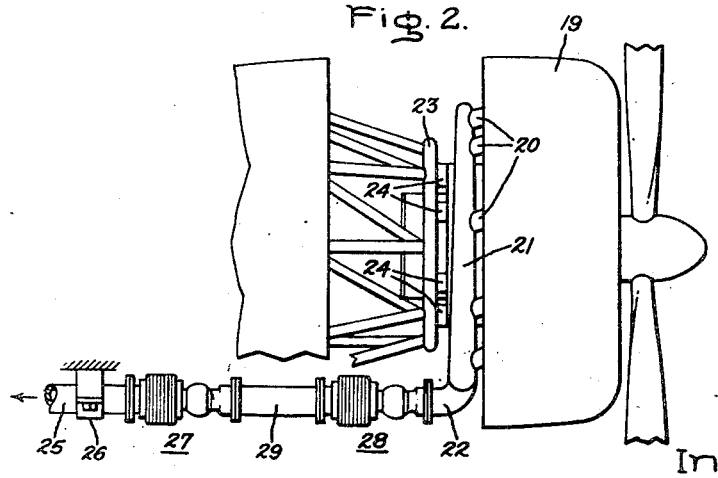

For a consideration of what I believe to be novel and my invention, attention is directed to the following description and the claims appended thereto taken in connection with the accompanying drawing, in which Fig. 1 illustrates a flexible joint made in accordance with my invention; and Fig. 2 shows an arrangement of two such joints in the exhaust gas conduit of an aircraft engine.

My flexible joint includes two conduits or conduit sections 1 and 2. The conduit sections have adjacent, substantially aligned, axially spaced, end portions connected by a flexible joint arrangement 3. This joint according to my invention comprises an intermediate conduit 4 which has a right-hand end portion sealed to one end of the conduit 2 by a ball joint 5 including a spherically-shaped member 6 secured to the conduit 2 and a spherical end portion 7 of the intermediate conduit 4 engaging the spherical member 6 and sealed thereto by a plurality of labyrinth seal grooves 8 in the member 6. This ball joint permits angular displacement between the center-lines of intermediate conduit 4 and the conduit 2, also rotational displacement of the conduit 2 about its own axis relative to conduit 4.

The left-hand end of the intermediate conduit 4 is connected to the adjacent end of the conduit 1 by slip joint means, in the present example by a combined slip and ball joint including a member 9 which has an inner cylindrical surface slidable longitudinally on the outer surface of the intermediate conduit 4 and an outer spherically-shaped surface engaging a spherically-shaped end portion 10 of the conduit 1. In the present instance the end portion 10 is separately manufactured and secured to the conduit 1 by an annular weld 11. The member 9 has a plurality of labyrinth seal grooves 17.

According to my invention the ball slip joint between the intermediate conduit 4 and the end conduit 1 is enclosed by a flexible bellows hermetically sealing the conduit 1 to the conduit 4. This seal includes a bellows 12 concentrically spaced from the conduits 1 and 4 and having end portions welded to cylinders 13, 14 respectively, which in turn are sealed to intermediate portions of the conduits 1 and 4 respectively by means of rings 15, 16.

It will be obvious that the bellows 12 provides a positive seal of the leakage paths through ball joint 9, 10. It should be noted that another equally important function of the bellows is to maintain good sealing engagement between members 6 and 7 of the ball joint between the conduit 2 and the conduit 4. During use, as in aircraft power plants, the pressure inside the conduits 1, 2 will ordinarily be substantially above atmospheric pressure. Some of the gases flowing through the conduits 1 and 2, preferably in the direction of the arrow 18, will leak through the clearances in the ball slip joint 9, 10 into the annular space defined by bellows 12. Inside the bellows this leakage gas will establish a pressure above ambient pressure, which positive pressure will cause axial expansion of the bellows with accompanying slippage between conduit 4 and member 9 and exert an axial force biasing conduit 4 away from conduit 1. This force is transmitted to the spherical end portion 7 of the intermediate conduit 4 which thereby is forced into good sealing engagement with the spherical member 6 of the ball joint. Similarly, if pressure inside the bellows 12 is below ambient pressure, conduit 4 will be pulled away from conduit 2 and again the end portion 7 will be biased, in the opposite direction, into good sealing engagement with spherical member 6.

In Fig. 2 is shown an arrangement whereby my improved sealed flexible joint can be used in the exhaust conduit of an aircraft engine to take up various displacements which occur between the engine and the airframe during operation. In Figure 2 the engine is shown enclosed in a cowling 19 of conventional arrangement. The individual cylinder exhaust stacks 20 discharge into a collector ring 21 which in turn empties into the main conduit 22. Stacks 20 and collector ring 21 are rigidly affixed to the engine. The engine is supported on the mounting ring 23 by means of resilient mounting members 24 of known construction. This resilient mounting permits axial and transverse vibration of the engine relative to the mounting ring 23, as well as certain rotational displacement between the engine and the mounting ring. Exhaust conduit 25 may lead the hot gases to a discharge nozzle or to a gas turbine, such as that of a turbo-supercharger. Conduit 25 is affixed to the airframe by support means 26.

In order to permit the aforementioned displacements between the engine and the airframe, two flexible joints 27, 28, each constructed in accordance with my invention are assembled to the conduit 25 and the collector ring outlet 22 with an intermediate section of conduit 29. It will be obvious from a consideration of the nature of my flexible joint that the assembly shown in Fig. 2 will readily permit axial displacement between conduit sections 22 and 25. It will be equally obvious how this arrangement permits angular displacements between the centerlines of conduits 22, 25 and 29. When in operation the power impulses imparted to the engine crank-shaft produce serious torsional vibrations which cause the engine to be oscillated rotationally about its axis with respect to the mounting ring 23. In this type of displacement, the conduit 22 is displaced laterally or "offset" with respect to the conduit 25, their axes remaining substantially parallel. This "offset" type of displacement is perhaps the most serious of all to provide for in an aircraft engine flexible conduit installation. A quite considerable amount of this offset displacement must be provided for, both to take up the aforementioned rotational oscillations between the engine and mounting ring, and also to compensate for certain inevitable misalignment of the exhaust collector fastened to the engine and the exhaust conduit fastened to the airframe. My flexible joint is particularly well suited, when arranged as shown in Fig. 2, to permit the above described rotational displacements.

The importance of sealing an aircraft engine exhaust collector conduit from the standpoint of fire hazards is obvious, since there is always more or less gasoline vapor and lubricating oil around the inside of an engine cell to be ignited by any burning gases leaking from the exhaust conduit. Sealing the exhaust conduit becomes extremely important from another standpoint when an aircraft engine is equipped with turbosuperchargers or other energy converters utilizing the energy in the hot gases. In order to secure the best engine fuel economy, leakage from the exhaust collector system must be reduced to a minimum, for every pound of hot exhaust gas lost by leakage means just that much energy is lost to the gas turbine or other energy converting device. This loss inevitably shows up as increased engine fuel consumption.

The known type of ball joints 6, 7 and 9, 10 have been found to be effective if provided with quite generous clearances to prevent binding as a result of the extreme temperature gradients and the resulting differential expansion which occur in service. Without the bellows seal arranged in accordance with my invention, such serious leakage may result, in the case of aircraft operating at high altitudes, as to decrease the cruising range of the aircraft by a very appreciable percentage.

It will be obvious to those skilled in the art that the ball joint 9, 10 may in some instances be omitted from the arrangement of Fig. 1. In that case the left end of the conduit section 4 would project into conduit 1 in loose telescopic relation so as to permit considerable radial, angular and axial displacement therebetween. It is, however, preferred to use the ball joint 9, 10, as it provides an additional margin of safety in the event that the flexible bellows 12 fails in service.

While I have shown one application in Fig. 2, it will be obvious that joints according to my invention may also be used advantageously at many other points in the exhaust collector system, as for instance in the stacks 20 between the engine exhaust port and the collector ring 21.

What I claim as new and desire to secure by Letters Patent of the United States is:

1. In a sealed flexible joint for a conduit adapted to carry fluid at a pressure different from ambient pressure, the combination of a first and a second conduit, an intermediate conduit, a combined ball and slip joint between one end of the intermediate conduit and the first conduit, a ball joint between the other end of the intermediate conduit and the second conduit, both of said joints having clearance spaces forming leakage paths, a bellows surrounding and spaced from the ball and slip joint, and means sealing the ends of the bellows to the first conduit and to the intermediate conduit respectively, whereby leakage through the ball and slip joint produces a biasing force between the second conduit and the intermediate conduit to minimize the clearance spaces between the parts of the ball joint.

2. A flexible joint including a first and a second conduit having adjacent axially spaced end portions, an intermediate conduit having an end portion connected to the first conduit by a first joint arranged to permit both axial and angular relative displacement and a second end portion connected to the second conduit by a joint which permits both angular and rotational relative displacements, and a flexible bellows enclosing the first joint and having end portions sealed to the first conduit and the intermediate conduit respectively.

3. A flexible joint including a first conduit, a second conduit and an intermediate conduit, a first joint connecting the first and the intermediate conduits and arranged to permit axial and angular relative displacements, a second joint connecting the second and the intermediate conduits and arranged to permit rotational and angular relative displacements only, and means arranged to seal both joints including a flexible member surrounding and spaced from the first joint and having end portions sealed to the first conduit and the intermediate conduit respectively.

4. In a sealed flexible joint adapted to effect axial, angular, rotational, and offset displacements between portions of a conduit for carrying fluid at a pressure substantially different from ambient pressure, the combination of a first conduit and a second conduit having adjacent axially spaced end portions, an intermediate conduit having an end portion connected to the first conduit by a first joint adapted to effect both axial and angular relative displacements and a second end portion connected to the second conduit by a second joint adapted to effect both angular and rotational relative displacements, each of said joints defining clearance spaces which form leakage paths, and a flexible bellows member enclosing the first joint and having end portions sealed to the first conduit and the intermediate conduit respectively, whereby fluid leaking through the clearances of the first joint creates a pressure differential across the bellows to produce a biasing force between the second conduit and the intermediate conduit to minimize the clearance spaces between the parts of said second joint.

EUGENE E. STOECKLY.

REFERENCES CITED

The following references are of record in the file of this patent:

UNITED STATES PATENTS

| Number | Name | Date |
|---|---|---|
| 1,821,274 | Plummer | Sept. 1, 1931 |
| 1,859,975 | Malkin | May 24, 1932 |
| 2,207,146 | Fentress et al. | July 9, 1940 |
| 2,363,477 | Barton | Nov. 28, 1944 |
| 2,381,432 | Bratton | Aug. 7, 1945 |